Patented Oct. 31, 1922.

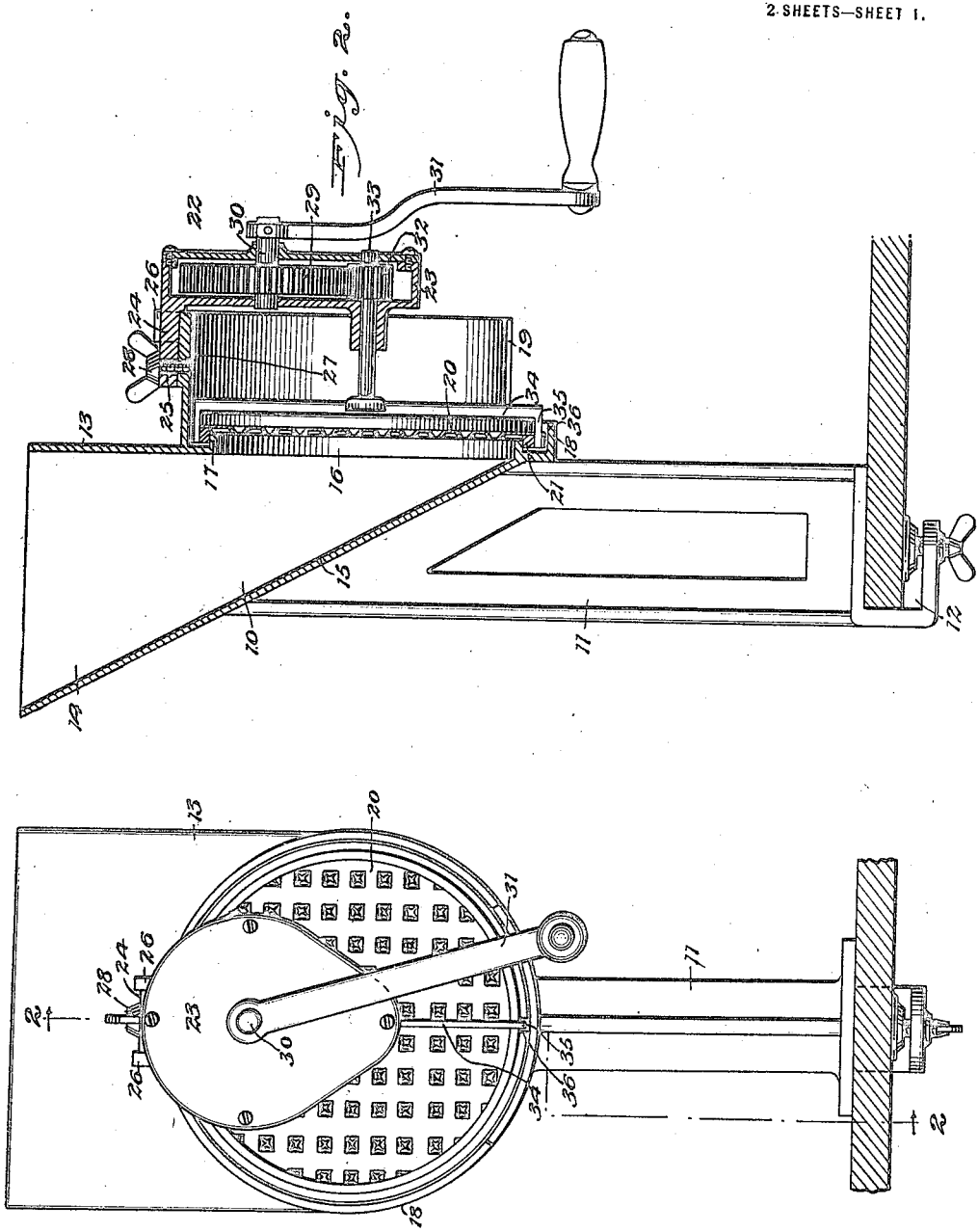

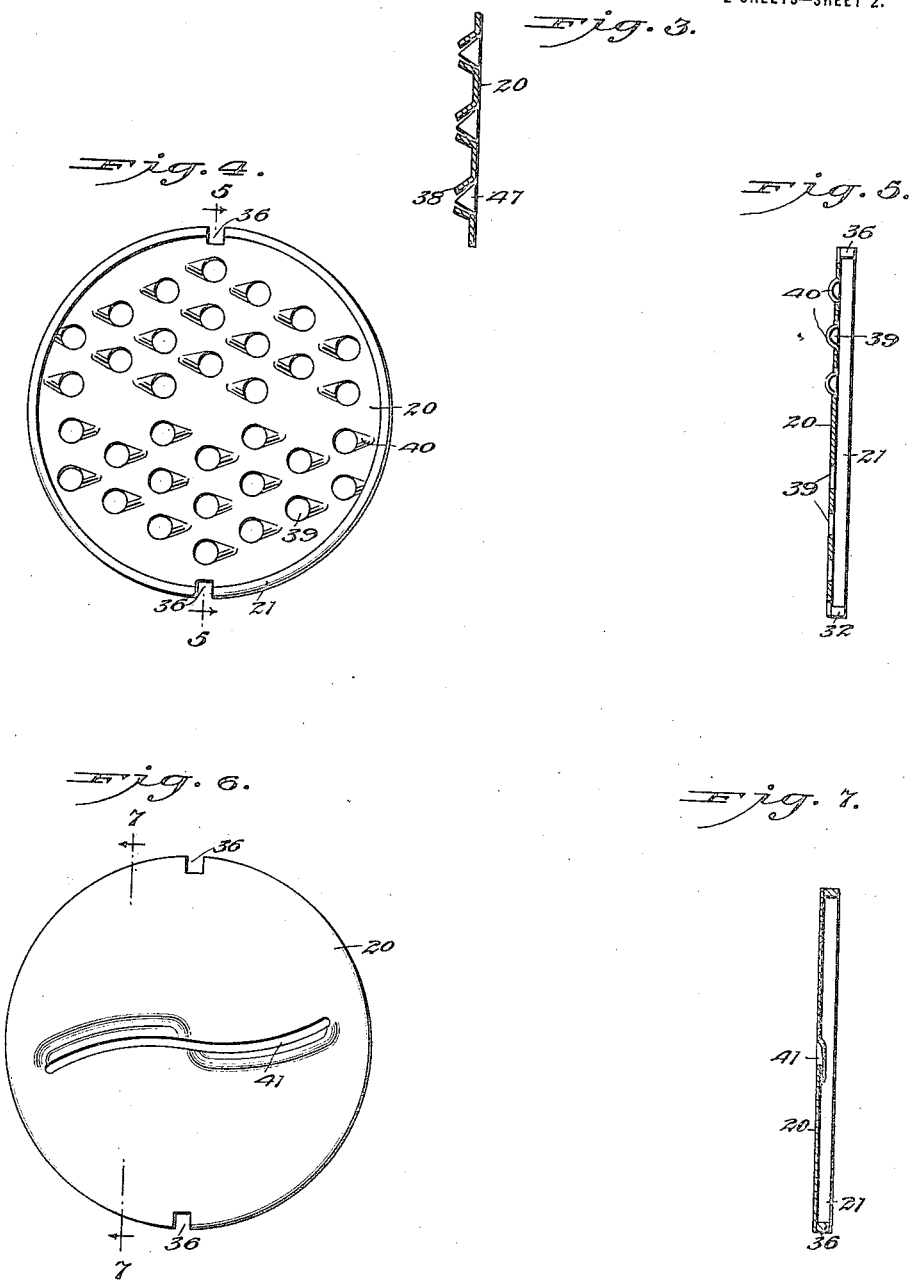

1,434,298

UNITED STATES PATENT OFFICE.

ISRAEL M. LENTUCH, OF BROOKLYN, NEW YORK, ASSIGNOR OF ONE-HALF TO MORRIS JAFFE, OF BROOKLYN, NEW YORK.

FOOD CHOPPER.

Application filed March 4, 1922. Serial No. 541,092.

*To all whom it may concern:*

Be it known that I, ISRAEL M. LENTUCH, a citizen of Russia, and a resident of the city of New York, borough of Brooklyn, in the county of Kings and State of New York, have invented a new and Improved Food Chopper, of which the following is a full, clear, and exact description.

This invention has relation to food choppers and refers more particularly to an improved chopper or cutter for grating, shredding, slicing or otherwise acting upon vegetables, fruits, cheese, or other foods of this character.

The invention contemplates a food chopper embodying a hopper having an inlet and an outlet within which the food is arranged and held stationary, and a grating, shredding, slicing or other cutter element, which is arranged in juxtaposition over the outlet and rotated against the food for operating upon the same, together with an actuating means for the cutter element which also serves as a means for retaining said element in juxtaposition to the outlet and permits of the separation of the same from the hopper.

As an object the invention aims to provide a simple and inexpensive food chopper with which a plurality of variously formed cutting elements may be readily associated or disassociated whereby to facilitate the cleansing and interchanging of the cutting elements and other parts or elements of the device.

Further objects reside in the construction and association of the actuating means with the hopper and actuating elements, and the structure of the cutting elements as set forth in the following specification, pointed out in the appended claims and illustrated in the accompanying drawings, it being understood that the right is reserved to embodiments other than those actually illustrated herein to the full extent indicated by the general meaning of the terms in which the claims are expressed.

In the drawing—

Figure 1 is a front elevation of a food chopper constructed in accordance with the invention.

Fig. 2 is a vertical sectional view therethrough taken approximately on the line 2—2 of Fig. 1.

Fig. 3 is an enlarged detail fragmentary sectional view through the cutter element illustrated in Figs. 1 and 2.

Fig. 4 is a rear face view of a shredding element adapted to be associated with the machine.

Fig. 5 is a sectional view therethrough taken on the line 5—5 of Fig. 4.

Fig. 6 is a front face view of a slicing element adapted to be associated with the machine.

Fig. 7 is a sectional view therethrough taken on the line 7—7 of Fig. 6.

Referring to the drawings by characters of reference, 10 designates a hopper supported by a suitable standard 11 which is provided at its lower end with a clamping means 12 for attaching the same to a table or ledge. The hopper is provided with a vertical front wall 13, vertical side walls 14, and a downwardly and inwardly inclined rear wall 15. The hopper is open at its upper end to provide an inlet for the food. The front wall is provided at its lower portion with a circular outlet opening 16 defined by an outwardly projecting bead 17. A second or outer bead or flange 18 is concentrically spaced from the inner bead 17 and said latter bead which is of greater width than the former is cut away at its lower end as at 19. The cutting or chopping elements consist of disks 20 provided with an annular bead or flange 21 at the inner peripheral edge thereof which is designed to be snugly received between the inner and outer beads 17 and 18 of the hopper whereby to arrange said cutting or chopping element over the outlet opening for rotation. In order to provide means for retaining the disk 20 in juxtaposition over the outlet opening and for driving the same, use is made of an actuating unit 22 comprising a housing 23 having a rearwardly projecting arm 24 provided with a vertical aperture 25. The upper portion of the flange 18 is provided with spaced upstanding ears 26 between which the arm 24 is received and said flange is further provided with a threaded aperture 27 which is designed to register with the aperture 25 to receive the wing screw 28 for attaching the casing 23 to the hopper. A driving gear 29 is mounted within the casing on a drive shaft 30 with which a manipulating crank 31 is connected. A driven gear 32 is mounted in the casing 23 and is secured to the driven shaft 33 which projects rearwardly from the casing and has connected thereto a spider arm 34 provided with rearwardly projecting fingers 35. Each of the cutter disks are provided with diametrically disposed notches 36 in their peripheries which receive the fingers 35 whereby said cutter element is coupled with the spider arm and shaft 33 for rotation therewith.

The cutter disk illustrated in Figs. 1, 2 and 3 is provided with outlet perforations 37 from which the rear edges of which grating spurs or teeth 38 protrude to provide an element for grating the vegetable, fruit, or other food fed to the hopper. In Figs. 4 and 5 the cutting disk 20 is provided with a plurality of apertures 39 defining one edge of which is arcuately bulged as at 40 to afford means for shredding the vegetable, fruit, or other food upon rotation of the disk. In Figs. 6 and 7 the cutting disk 20 is provided with a slicing slot 41 for slicing the vegetable, fruit or food fed to the hopper.

In use and operation of the device, the food to be acted upon is fed to the hopper through the upper open end and pressed downwardly into the lower restricted end thereof into contact with the cutter disk 20 arranged over the outlet opening 16, said food being held stationary or in a non-rotary position against the face of the cutter while the crank handle 31 is manipulated to effect rotation of the cutter disk. Upon rotation of the disk the cutter teeth or spurs 38 will effect the grating of the food which will be discharged through the openings 37 and which will gravitate through the cutaway portion 19 of the outer bead or flange 18 into a suitable receptacle arranged on the table or ledge. When it is desired to remove the cutter disk or element 20 for the purpose of cleaning said elements or cleansing the various parts of the device, a winged screw 28 is removed, thereby permitting of the axial displacement of the casing 23 and its component parts. The removal of the casing and its parts effects the displacement of the fingers 35 from the notches 36 of the cutting element, thereby uncoupling the same and permitting of the removal of the cutting element. When the chopper is assembled, the engagement of the fingers 35 in the notches 36 couples the cutting element with the actuating unit for rotation therewith.

I claim:

1. A food chopper comprising a hopper having an inlet and an outlet, inner and outer concentric annular beads on said hopper defining said outlet, a rotary cutting or chopping element having an annular bead received between the first beads to dispose the cutting or chopping element in juxtaposition over the outlet.

2. A food chopper comprising a hopper having an inlet and an outlet, inner and outer concentric annular beads on said hopper defining said outlet, a rotary cutting or chopping element having an annular bead received between the first beads to dispose the cutting or chopping element in juxtaposition over the outlet, and an actuating means therefor coacting with the outer bead and the cutting or chopping element to retain said element in juxtaposition and to rotate the same.

3. A food chopper comprising a hopper having an inlet and an outlet, inner and outer concentric annular beads on said hopper defining said outlet, a rotary cutting or chopping element having an annular bead received between the first beads to dispose the cutting or chopping element in juxtaposition over the outlet, and an actuating means therefor coacting with the outer bead and the cutting or chopping element to retain said element in juxtaposition and to rotate the same, said means comprising a casing detachably secured to the outer bead, a rotary shaft extending rearwardly therefrom, notched peripheral portions in the cutter element, and a spider carried by the inner end of the shaft having fingers engaged within said notched portions.

4. In a food chopper, a hopper having an outlet, spaced inner and outer annular beads defining said outlet, a rotary cutting element having a peripheral bead received between the hopper beads and provided with diametrically disposed peripheral notches, an actuating unit comprising a casing detachably associated with the outer hopper bead, a drive shaft mounted in said casing, a driving gear attached thereto, a driven shaft mounted in said casing and projecting rearwardly therefrom, a driven gear connected thereto and meshing with the driving gear, a spider carried by the rear end of the shaft having coupling fingers at its opposite extremity engageable in the peripheral notches of the cutting element, and means for actuating the driving shaft.

ISRAEL M. LENTUCH.